US012265345B2

(12) United States Patent
Sasaoka et al.

(10) Patent No.: US 12,265,345 B2
(45) Date of Patent: Apr. 1, 2025

(54) IMAGE FORMING APPARATUS

(71) Applicant: CANON KABUSHIKI KAISHA, Tokyo (JP)

(72) Inventors: Osamu Sasaoka, Kanagawa (JP); Akinori Yokota, Tokyo (JP); Toshiyuki Watanabe, Kanagawa (JP); Yasuhiro Fukase, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/519,218

(22) Filed: Nov. 27, 2023

(65) Prior Publication Data

US 2024/0176264 A1 May 30, 2024

(30) Foreign Application Priority Data

Nov. 30, 2022 (JP) ................................ 2022-192260

(51) Int. Cl.
*G03G 15/20* (2006.01)
*G03G 15/00* (2006.01)
*G03G 15/16* (2006.01)

(52) U.S. Cl.
CPC ....... *G03G 15/1675* (2013.01); *G03G 15/607* (2013.01); *G03G 15/70* (2013.01); *G03G 2215/00679* (2013.01); *G03G 2215/066* (2013.01)

(58) Field of Classification Search
CPC ........... G03G 15/1675; G03G 15/2028; G03G 15/5029; G03G 15/607; G03G 15/70
USPC .................................................... 399/21, 405
See application file for complete search history.

(56) References Cited

U.S. PATENT DOCUMENTS

| | | | | |
|---|---|---|---|---|
| 8,131,203 | B2 | 3/2012 | Kitan | |
| 9,104,165 | B2 * | 8/2015 | Eguchi | G03G 15/70 |
| 9,720,358 | B2 * | 8/2017 | Nihei | G03G 15/2028 |
| 11,634,292 | B2 * | 4/2023 | Machii | G03G 15/5029 270/1.01 |

FOREIGN PATENT DOCUMENTS

| | | |
|---|---|---|
| JP | H04-314061 A | 11/1992 |
| JP | H09-190060 A | 7/1997 |

(Continued)

OTHER PUBLICATIONS

Japanese Office Action dated Mar. 19, 2024, in related Japanese Patent Application No. 2022-192260.

(Continued)

*Primary Examiner* — Hoan H Tran
(74) *Attorney, Agent, or Firm* — VENABLE LLP

(57) ABSTRACT

An image forming apparatus includes a conveyance unit configured to convey a sheet in a conveyance direction, an image bearing member, a transfer unit, a fixing unit, a sheet discharge unit, a detection unit, and a control unit configured to control conveyance of the sheet by controlling the conveyance unit and the image bearing member. In a case where the control unit has judged that a jam occurred by a jammed sheet based on a detection result of the detection unit, the control unit is configured to perform a conveyance processing of conveying the jammed sheet such that a trailing edge of the jammed sheet reaches a downstream side of the transfer nip in the conveyance direction.

16 Claims, 12 Drawing Sheets

(56) References Cited

FOREIGN PATENT DOCUMENTS

| | | | |
|---|---|---|---|
| JP | H11-227985 | A | 8/1999 |
| JP | 2004-245954 | A | 9/2004 |
| JP | 2004-309714 | A | 11/2004 |
| JP | 2007-065328 | A | 3/2007 |
| JP | 2008-254868 | A | 10/2008 |
| JP | 2008-268453 | A | 11/2008 |
| JP | 2009-155007 | A | 7/2009 |
| JP | 2011-033905 | A | 2/2011 |
| JP | 2018-116195 | A | 7/2018 |
| JP | 2018-197851 | A | 12/2018 |
| JP | 2021-140130 | A | 9/2021 |

OTHER PUBLICATIONS

Japanese Office Action dated Aug. 20, 2023, in Japanese Patent Application No. 2022-192260.

* cited by examiner

IMAGE FORMING APPARATUS

BACKGROUND OF THE INVENTION

Field of the Invention

This disclosure relates to an image forming apparatus forming an image on a sheet.

Description of the Related Art

Generally, in a case where, in image forming apparatuses that use an electrophotographic technology, defective conveyance such as the clogging of a sheet (hereinafter, referred to as a jam) occurs during image formation, a control function to immediately interrupt the image formation is enabled. At this time, in the image forming apparatuses described above, all control relating to printing such as sheet conveyance, image drawing, developing, transferring, and fixing processing is halted.

According to Japanese Patent Laid Open No. H11-227985, an image forming apparatus that includes a registration roller pair sending the sheet toward a transfer unit, which transfers a toner image on a photosensitive member onto the sheet, is disclosed. In the image forming apparatus mentioned above, if the jam occurs in a state in which the sheet is nipped by the registration roller pair, the registration roller pair is controlled to be rotatably driven in a clockwise or counter-clockwise direction so as to forcibly release the sheet from a nip of the registration roller pair.

SUMMARY OF THE INVENTION

According to one aspect of the present invention, an image forming apparatus includes a conveyance unit configured to convey a sheet in a conveyance direction, an image bearing member configured to bear a toner image, a transfer unit configured to form a transfer nip together with the image bearing member, the transfer unit being configured to transfer, in the transfer nip, the toner image borne on the image bearing member to the sheet conveyed by the conveyance unit, a fixing unit configured to fix the toner image, transferred onto the sheet in the transfer nip, on the sheet in a fixing nip, a sheet discharge unit configured to discharge the sheet on which the toner image has been fixed by the fixing unit, a detection unit arranged between the fixing nip and the sheet discharge unit in the conveyance direction and configured to detect the sheet, and a control unit configured to control conveyance of the sheet by controlling the conveyance unit and the image bearing member. In a case where the control unit has judged that a jam occurred by a jammed sheet based on a detection result of the detection unit, the control unit is configured to perform a conveyance processing of conveying the jammed sheet such that a trailing edge of the jammed sheet reaches a downstream side of the transfer nip in the conveyance direction.

Further features of the present invention will become apparent from the following description of exemplary embodiments with reference to the attached drawings.

DESCRIPTION OF THE EMBODIMENTS

Overall Configuration

Figure 1:
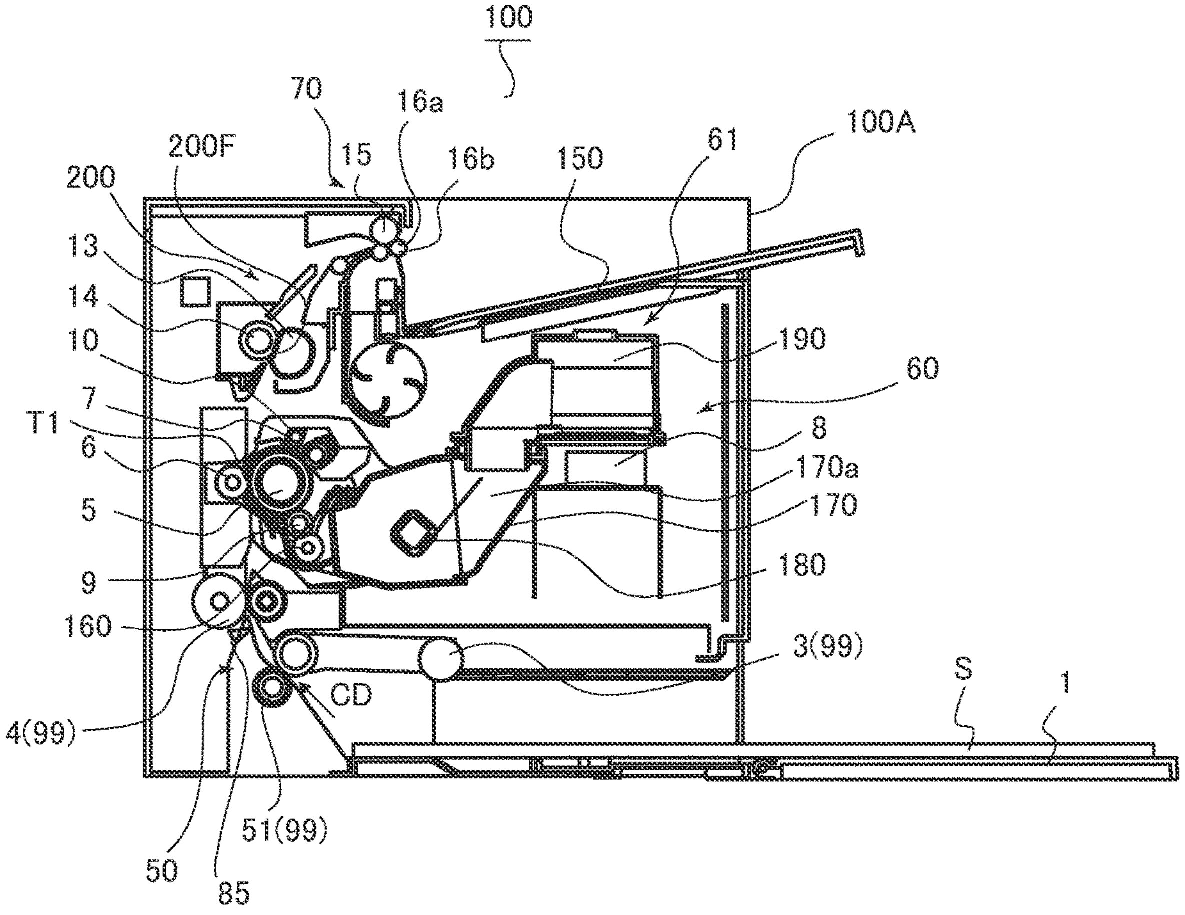
FIG. 1 is a schematic overall view illustrating a printer of the present embodiment.

A printer 100, serving as an image forming apparatus, is a laser beam printer forming a monochrome toner image. FIG. 1 is a schematic overall view illustrating the printer 100. As illustrated in FIG. 1, the printer 100 includes a sheet feeding unit 50 feeding a sheet S, an image forming unit 60 forming an image on the sheet S that has been fed, and a fixing unit 200. The sheet S includes paper such as a paper sheet and an envelope, a plastic film such as a sheet for an overhead projector (OHP), cloth, and the like.

When an image formation instruction is output to the printer 100, the printer 100 starts an image forming process by the image forming unit 60 based on image information input from such as an external computer connected to the printer 100. The image forming unit 60 includes a process cartridge 61, serving as a developing unit, a laser scanner 8, and a transfer roller 6.

The process cartridge 61 includes a rotatable photosensitive drum 5, a charge roller 7 arranged along the photosensitive drum 5, a developing roller 9, an exposing member 10, a supply roller 160, and a developer container 170. The developer container 170 includes a storage portion 170*a* storing toner, and rotatably supports an agitation unit 180 that agitates the toner inside of the storage portion 170*a*. The agitation unit 180 rotates by receiving drive from a drive source, not shown, and supplies the toner to the supply roller 160. Then, the supply roller 160 supplies the toner to the developing roller 9, serving as a developing member.

Further, a replenishment port 190 is formed in the developer container 170 so as to replenish the toner from the outside. It is possible to mount a toner container, in which the toner is stored, to the replenishment port 190. The user can expose the replenishment port 190 by opening a sheet discharge tray 150 or a lid portion, not shown, disposed in the sheet discharge tray 150. Then, the user can replenish the toner to the developer container 170 by mounting the toner container to the replenishment port 190. At this time, at least a part of the toner container mounted to the replenishment port 190 is exposed outside of the printer 100.

The transfer roller 6, serving as a transfer unit, forms a transfer nip T1 together with the photosensitive drum 5. The laser scanner 8 emits a laser beam toward the photosensitive drum 5 based on the image information that has been input. At this time, the photosensitive drum 5, serving as an image bearing member, has been charged by the charge roller 7 beforehand, and, by being irradiated with the laser beam, an electrostatic latent image is formed on the photosensitive drum 5. Thereafter, this electrostatic latent image is developed by the developing roller 9, and the monochrome toner image is formed on the photosensitive drum 5.

In parallel with the image forming process described above, the sheet is fed from the sheet feeding unit 50. The sheet feeding unit 50 includes a sheet feed tray 1 on which the sheet S is stacked, a pickup roller 3, and a separation roller pair 51. The sheet feed tray 1 is openably supported with respect to a casing 100A of the printer 100. The sheet feed tray 1 forms a part of a front exterior of the printer 100 in a closed state, and, when opened, allows the user to access a sheet storage space inside of the casing 100A. To be noted, the sheet feed tray 1 does not necessarily have a pivotable configuration, and can be configured to be stowed and retracted with respect to the casing 100A in a sliding manner. Further, while, in the present embodiment, the process cartridge 61 is disposed detachably with respect to the casing 100A, it is acceptable that the process cartridge 61 is disposed not detachably with respect to the casing 100A.

In response to the image formation instruction, the pickup roller 3 rotates, and the sheet S supported by the sheet feed tray 1 is fed by the pickup roller 3. The sheet S that has been fed by the pickup roller 3 is separated one sheet at a time by the separation roller pair 51. To be noted, in place of the pickup roller 3, it is acceptable to feed the sheet S by such as a belt.

The sheet S that has been separated one sheet at a time is conveyed to a registration roller pair 4, and the skew of the sheet S is corrected when a leading edge of the sheet abuts against a nip of the registration roller pair 4 that is in a stopped state. The registration roller pair 4 is driven in a predetermined conveyance timing synchronously with a transfer timing in the transfer nip T1. Then, the toner image borne on the photosensitive drum 5 is transferred onto the sheet S, which has been conveyed by the registration roller pair 4, in the transfer nip T1 by an electrostatic load bias applied to the transfer roller 6. To be noted, since there are variations in an electrical potential of the photosensitive drum 5 after the transfer, the exposing member 10 adjusts the electrical potential to a predetermined value, and prepares for charging needed for forming the image on the next sheet.

In a fixing nip 200F formed by a heating unit 13 and a press roller 14 of the fixing unit 200, predetermined heat and pressure are applied to the sheet S onto which the toner image has been transferred, and the toner is melted and bonded (fixed). The sheet that has passed through the fixing unit 200 is discharged outside of the printer 100 by a sheet discharge unit 70, and loaded on the sheet discharge tray 150.

The sheet discharge unit 70 includes a sheet discharge roller 15 driven by a motor M (refer to FIG. 9) and two driven rollers 16*a* and 16*b* that are rotatably driven by the sheet discharge roller 15. Since the two driven rollers 16*a* and 16*b* form nips with respect to the sheet discharge roller 15, the sheet discharge unit 70 has a function to correct the sheet S which has curled in the fixing unit 200. To be noted, while, in the present embodiment, the sheet discharge unit 70 includes the two driven rollers 16*a* and 16*b*, it is not limited to this, and, for example, it is acceptable that the sheet discharge unit 70 includes only one driven roller.

Configuration of Fixing Unit

Figure 2:
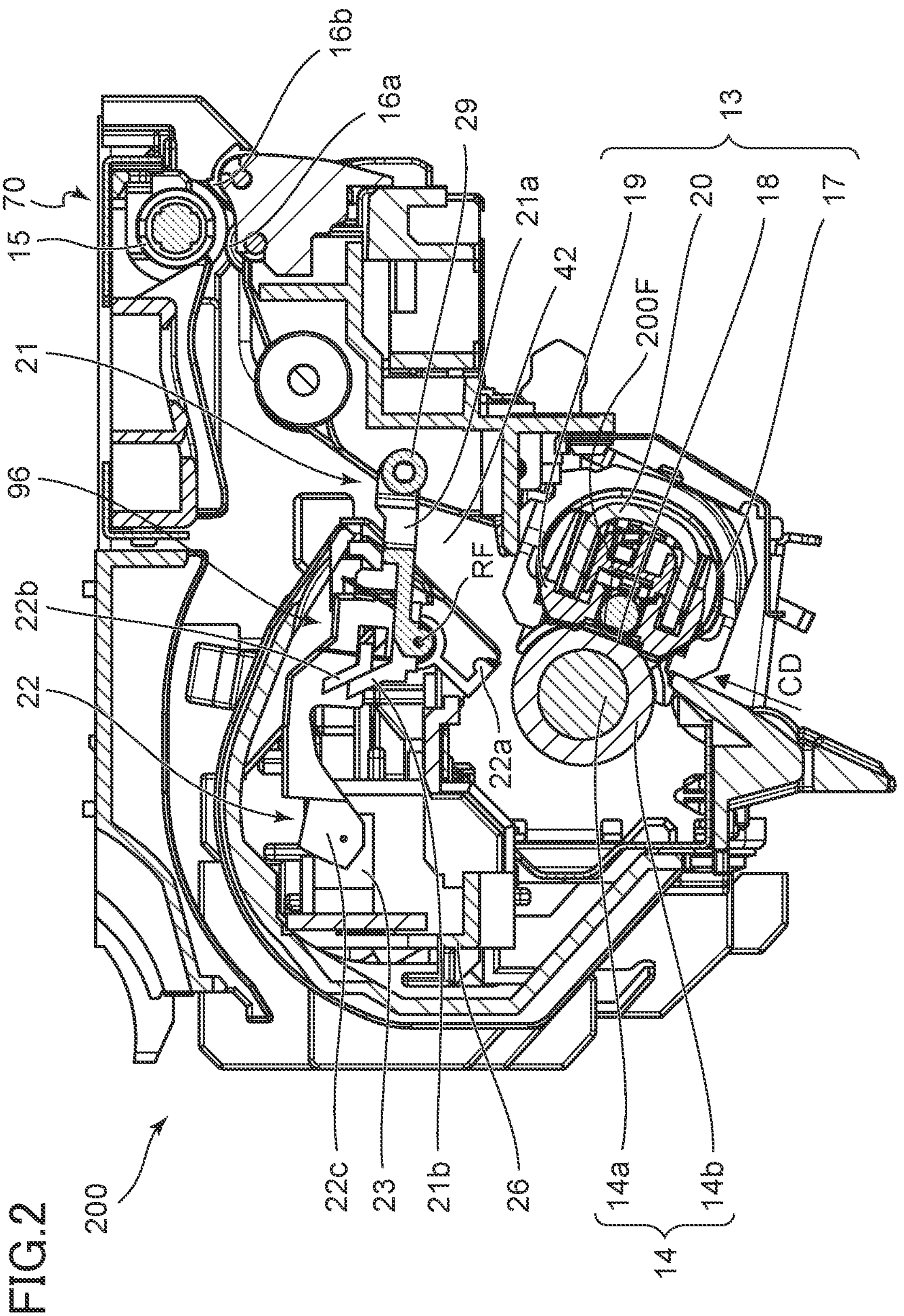
FIG. 2 is a cross-sectional view illustrating a fixing unit.

Next, the fixing unit 200 of the present embodiment will be described. FIG. 2 is a cross-sectional view illustrating the fixing unit 200 of the present embodiment. As illustrated in FIG. 2, the fixing unit 200, serving as a fixing unit, includes the heating unit 13 and the press roller 14. Further, the fixing unit 200 includes a first flag 21, a second flag 22, a discharge sensor 23, and a conveyance guide 26.

The heating unit 13 that heats the sheet S includes a tubular fixing film 17, a heater 18 that heats the fixing film by inscribing in the fixing film 17, a holder 19 having heat resistance, and a stay 20. The fixing film 17 is, for example, a thin tubular plastic film having high heat resistance and high thermal conductivity. The heater 18 is a heat generating body formed by applying a conductive substance to a base material of metal that has been insulated with a coating. The heater 18 generates the heat by being provided with electricity from a power source, not shown. The heater 18 is fitted to a groove portion of the holder 19, and supported by the holder 19 in a fixed state. The fixing film 17 is mounted in a manner that covers an outer circumference of the heater 18, the holder 19, and the stay 20, and capable of moving rotationally.

By receiving a force of a pressing spring, not shown, the heating unit 13 comes into contact with the press roller 14 with a predetermined pressure, and forms the fixing nip 200F. The press roller 14 includes a core metal 14*a* and a heat resistant elastic layer 14*b*, molded into a form of a roller around an outer circumference of this core metal 14*a*. Since the heat resistant elastic layer 14*b* of the press roller 14 has elasticity, the fixing nip 200F having a predetermined width in a conveyance direction of the sheet S is formed between the heating unit 13 and the press roller 14. The press roller 14 is rotatably driven at a predetermined speed by the motor M (refer to FIG. 9). By the rotation of this press roller 14, a friction force is generated between the fixing film 17 and the press roller 14, and the fixing film 17 is rotated by the press roller 14.

In a state in which the heating roller 14 and the fixing film 17 are rotating and the heater 18 is generating the heat, the sheet S bearing an unfixed toner image is conveyed to the fixing nip 200F between the fixing film 17 and the press roller 14. The sheet S that has reached the fixing nip 200F is conveyed in a state of being nipped by the press roller 14 and the fixing film 17. In this process, the heat of the heater 18 is applied to the sheet S via the fixing film 17, and the unfixed toner image is heated and pressed, so that the toner image is fixed on the sheet S.

The curvature of the press roller 14 and the fixing film 17 is set such that the sheet S having passed through the fixing nip 200F is separated from the press roller 14 and the fixing film 17. The sheet S is conveyed downstream of the fixing nip 200F in the conveyance direction CD by the press roller 14 and the fixing film 17.

A conveyance path 42 is arranged downstream of the fixing nip 200F (downstream of the heating unit 13) in the conveyance direction CD of the sheet S. On the downstream side of the heating unit 13 (downstream side of the fixing nip 200F), the sheet S can pass through the conveyance path 42, and the conveyance path 42 guides the sheet S toward the sheet discharge unit 70. The sheet S is conveyed through the conveyance path 42 by the press roller 14. The sheet S that passes through the conveyance path 42 comes into contact with the first flag 21 projecting to the conveyance path 42, and pivots the first flag 21. The behavior of the first flag 21 will be described in detail below.

Details of Sheet Detection Unit

Figure 3:
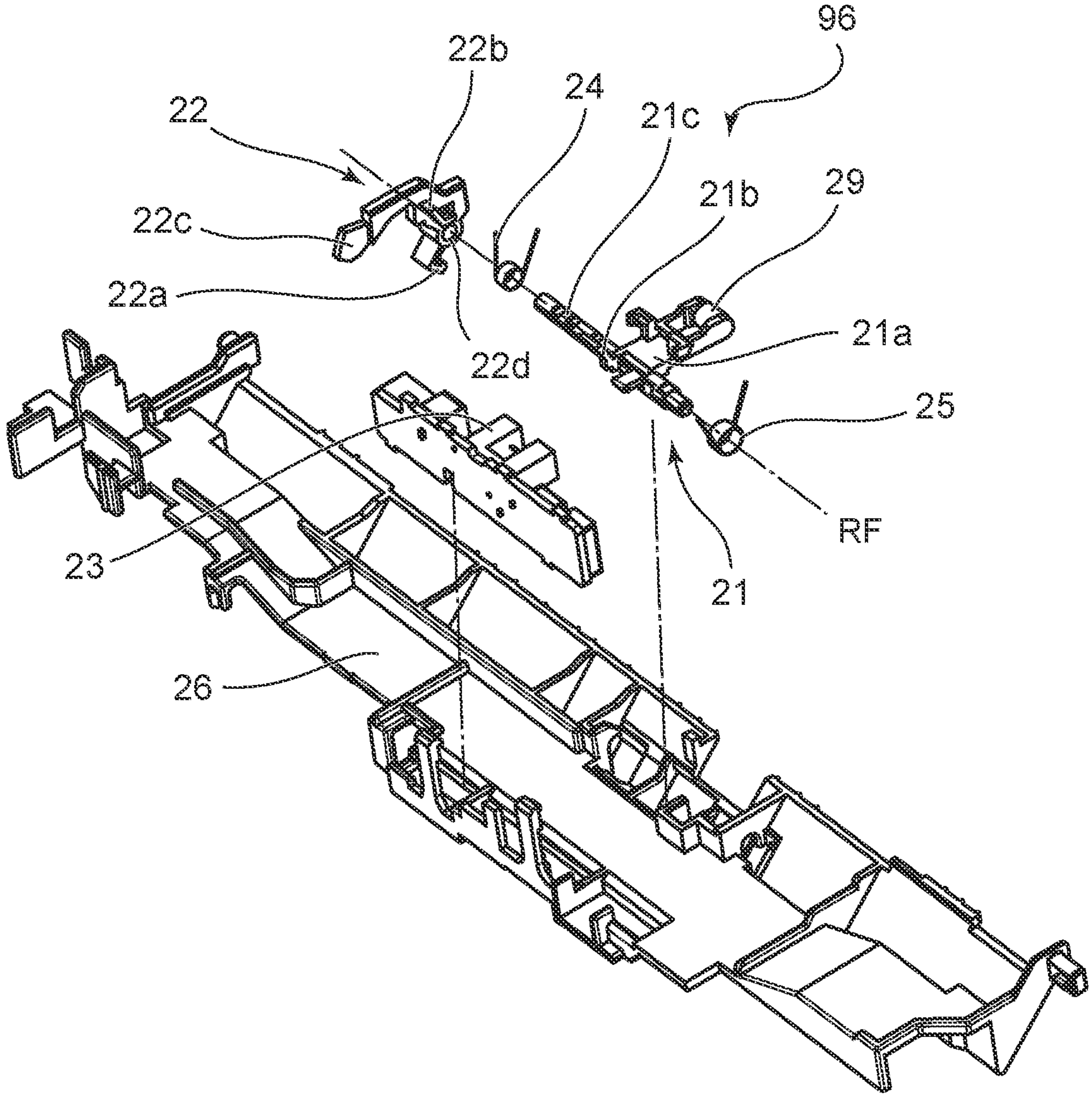
FIG. 3 is an exploded perspective view illustrating a first flag, a second flag, and a discharge sensor.
Figure 4:
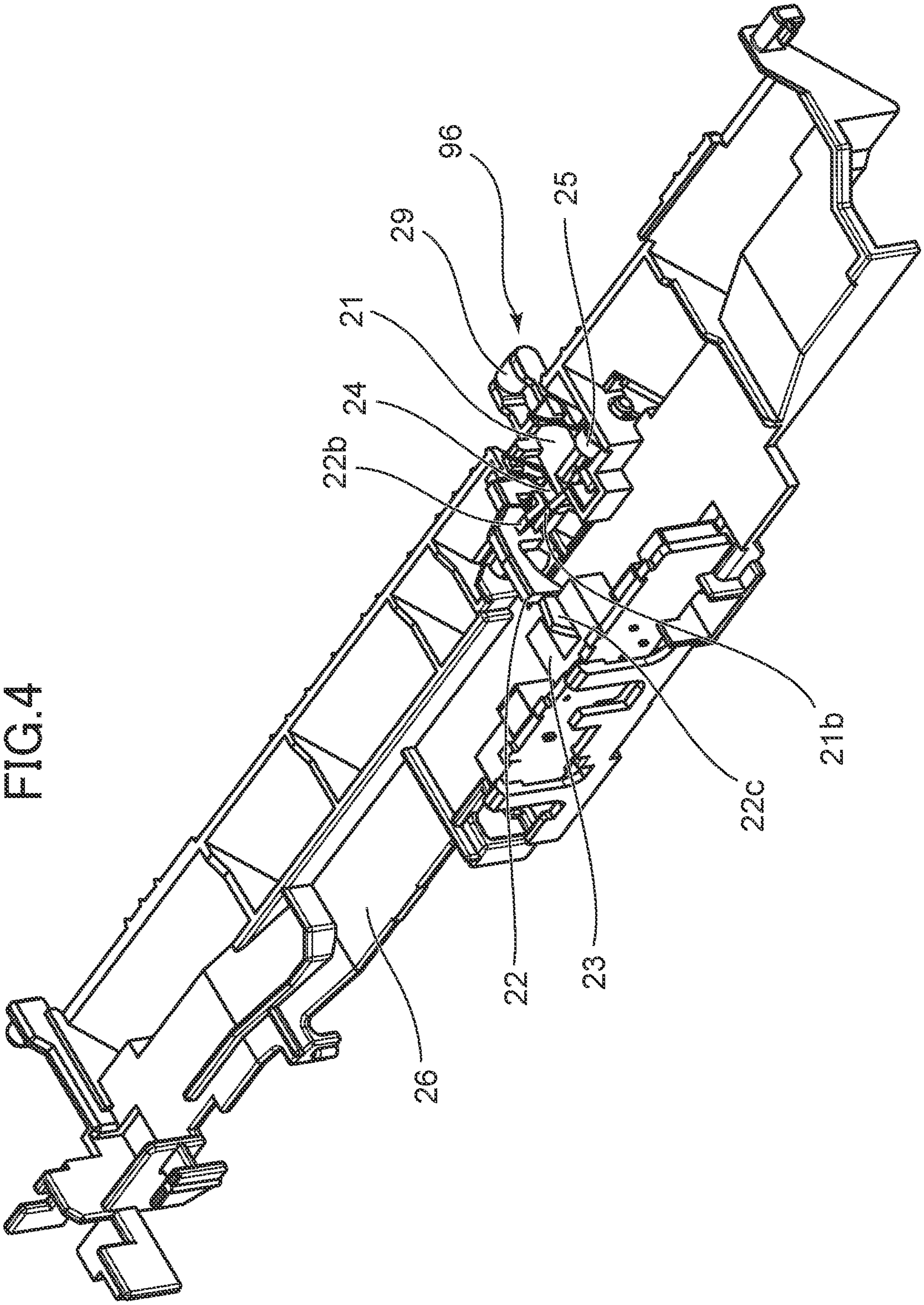
FIG. 4 is a perspective view illustrating a state in which the first flag, the second flag, and the discharge sensor are combined.

Next, using FIGS. 2 to 4, a sheet detection unit 96, serving as a detection unit that detects the sheet S, will be described. FIG. 3 is an exploded perspective view illustrating the first flag 21, the second flag 22, and the discharge sensor 23. FIG. 4 is a perspective view illustrating a state in which the first flag 21, the second flag 22, and the discharge sensor 23 are combined.

As illustrated in FIGS. 2 to 4, the fixing unit 200 includes the sheet detection unit 96 incorporating the first flag 21, the second flag 22, and the discharge sensor 23. The sheet detection unit 96, serving as the detection unit and a first detection unit, is arranged between the fixing nip 200F and the sheet discharge unit 70 in the conveyance direction CD. The discharge sensor 23, serving as a sensor, detects a movement of the second flag 22.

The second flag 22, serving as a second moving member, is movable with respect to the first flag 21. In the present embodiment, the second flag 22 is fitted to the first flag 21. The first flag 21, serving as a first moving member, is movable between a first projecting position (refer to FIG. 2), described below, and a first retracting position (refer to FIG. 5) retracting from the first projecting position. The second flag 22 is movable between a second projecting position (refer to FIG. 5), described below, and a second retracting position (refer to FIG. 2) retracting from the second projecting position.

As illustrated in FIGS. 3 and 4, the first flag 21 includes a first projecting portion 21*a*, a rotation stop portion 21*b*, serving as a supporting portion, and a shaft portion 21*c*. The second flag 22 includes a second projecting portion 22*a*, a regulated portion 22*b*, serving as a supported portion, a detected portion 22*c*, and a hole 22*d*. By inserting the shaft portion 21*c* into the hole 22*d*, the second flag 22 is fitted to the first flag 21. The second projecting portion 22*a* is arranged upstream of the first projecting portion 21*a* in the conveyance path 42 in the conveyance direction CD (refer to FIG. 2) of the sheet S.

In other words, one of the first and second flags 21 and 22 includes an engagement portion (shaft portion), and the other of the first and second flags 21 and 22 includes an engaged portion (hole portion) that engages with the engagement portion. To be noted, it is acceptable that the first flag 21 includes a hole portion and the second flag 22 includes a shaft portion. Further, it is acceptable that both the first and second flags 21 and 22 include a hole portion (engaged portion), and are engaged with a shaft portion (engagement portion) supported by the conveyance guide 26.

The first and second flags 21 and 22 are fitted to the conveyance guide 26 of the fixing unit 200. In particular, the shaft portion 21*c* of the first flag 21 is rotatably supported by the conveyance guide 26, and the second flag 22 is rotatably supported by the shaft portion 21*c*. Consequently, the first and second flags 21 and 22 are supported rotatably (in a swingable manner) around a rotational axis RF. In other words, the first flag 21 is rotatable around the rotational axis RF, and the second flag 22 is also rotatable around the rotational axis RF.

In the present embodiment, the discharge sensor 23 is fitted to the conveyance guide 26. Since the first flag 21, the second flag 22, and the discharge sensor 23 are positioned by the conveyance guide 26, serving as a single frame body, positional accuracy with respect to each other is improved.

In the present embodiment, the discharge sensor 23 is an optical sensor. When the detected portion 22*c* of the second flag 22 enters a slit portion of the discharge sensor 23, the discharge sensor 23 becomes a light-shielding state. When the detected portion 22*c* of the second flag 22 retracts from the slit portion of the discharge sensor 23, the discharge sensor 23 becomes a light-transmitting state. Upon being switched between the light-shielding and light-transmitting states, a signal that is output from the discharge sensor 23 changes. Based on this change in the signal, a control unit 80 (refer to FIG. 9) detects the movement of the second flag 22. Based on the signal that is output from the discharge sensor 23, by controlling the motor M (refer to FIG. 9), the control unit 80 drives or stops a conveyance unit 87 (refer to FIG. 9).

A flag urging spring 24 is arranged between the first and second flags 21 and 22. The flag urging spring 24, serving as an urging member, is a torsion coil spring. The shaft portion 21*c* is inserted into the flag urging spring 24. A first end of the flag urging spring 24 presses the first flag 21, and a second end of the flag urging spring 24 presses the second flag 22. That is, the flag urging spring 24 urges the first and second flags 21 and 22. Consequently, the regulated portion 22*b* of the second flag 22 is pressed to the rotation stop portion 21*b* of the first flag 21, and the rotation stop portion 21*b* of the first flag 21 and the regulated portion 22*b* of the second flag 22 come into contact with each other. Then, in a state in which the rotation stop portion 21*b* and the regulated portion 22*b* come into contact with each other, the first flag 21 moves from the first projecting position to the first retracting position, and, integrally with the first flag 21, the second flag 22 moves from the second retracting position to the second projecting position.

A flag holding spring 25 is fitted to the first flag 21. The flag holding spring 25 is a torsion coil spring. The shaft portion 21*c* is inserted into the flag holding spring 25. A first end of the flag holding spring 25 presses the conveyance guide 26, and a second end of the flag holding spring 25 presses the first flag 21. By generating an urging force between the first flag 21 and the conveyance guide 26, the flag holding spring 25 holds the posture of the first flag 21.

Further, the first projecting portion 21*a* of the first flag 21 directly comes into contact with the sheet S. A tip roller 29 is rotatably fitted to a tip of the first projecting portion 21*a*. By the tip roller 29, a friction force acting on the sheet S is reduced.

Behavior of First and Second Flags

Figure 5:
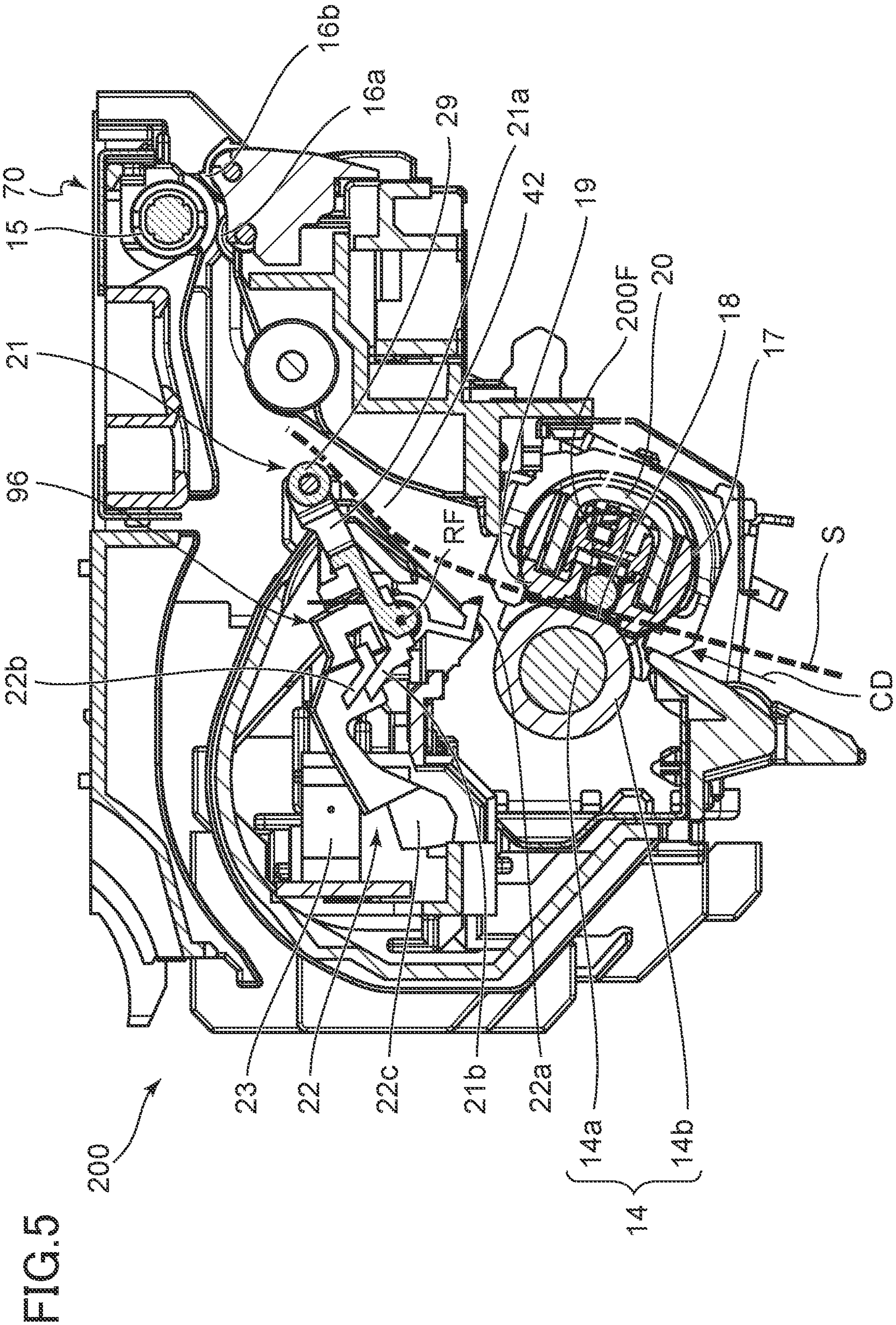
FIG. 5 is a cross-sectional view illustrating the fixing unit in a state in which the first flag has been moved by a sheet.

Next, using FIGS. 2 to 5, the behavior of the first and second flags 21 and 22 by the sheet S will be described. FIG. 5 is a cross-sectional view illustrating the fixing unit 200 in a state in which the first flag 21 is moved by the sheet S.

As illustrated in FIG. 2, in a state in which the first flag 21 is not being pressed by the sheet S, the first flag 21 is in the first projecting position where the first projecting portion 21*a* projects toward the conveyance path 42 by the flag holding spring 25. At this time, since the regulated portion 22*b* of the second flag 22 is pressed to the rotation stop portion 21*b* of the first flag 21, the second flag 22 is in the second retracting position. In a state in which the second flag 22 is in the second retracting position, the second projecting portion 22*a* retracts from the conveyance path 42. Further, the detected portion 22*c* of the second flag 22 enters the slit portion of the discharge sensor 23, and the discharge sensor 23 becomes the light-shielding state.

As illustrated in FIG. 5, when the sheet S passes through the fixing nip 200F and comes into contact with the first projecting portion 21*a* of the first flag 21, the first flag 21 moves from the first projecting position to the first retracting position. In particular, the first projecting portion 21*a* is pressed by the sheet S that is conveyed by the fixing nip 200F, and the first flag 21 rotates in a counter-clockwise direction in FIGS. 2 and 5 around the rotational axis RF as a center. Thereby, the first flag 21 moves from the first projecting position to the first retracting position.

When the first flag 21 rotates in the counter-clockwise direction and moves from the first projecting position to the first retracting position, the second flag 22 moves from the second retracting position to the second projecting position where the second projecting portion 22*a* projects toward the conveyance path 42. In particular, by rotating the first flag 21 in the counter-clockwise direction, the second flag 22 also rotates integrally with the first flag 21 in the counter-clockwise direction. Consequently, as illustrated in FIG. 5, the second flag 22 is positioned in the second projecting position.

When the second flag 22 moves from the second retracting position to the second projecting position, the detected portion 22*c* of the second flag 22 retracts from the slit portion of the discharge sensor 23. Consequently, the discharge sensor 23 is switched from the light-shielding state to the light-transmitting state, and the output of the discharge sensor 23 (the signal that is output from the discharge sensor 23) changes. By this change in the output, the control unit 80 (refer to FIG. 9) detects a position of a leading edge of the sheet S, and, in a case where the position of the leading edge of the sheet S is not within a predetermined range, judges that the clogging of the sheet S (hereinafter, referred to as a jam) has occurred.

When the sheet S has been conveyed normally and a trailing edge of the sheet S has passed through the first projecting portion 21*a*, the first flag 21 that is urged by the flag holding spring 25 rotates in a clockwise direction around the rotational axis RF, and the first flag 21 moves from the first retracting position to the first projecting position. When the first flag 21 moves from the first retracting position to the first projecting position, the second flag 22 also moves from the second projecting position to the second retracting position. Consequently, the detected portion 22*c* blocks the discharge sensor 23, and the discharge sensor 23 is switched from the light-transmitting state to the light-shielding state, so that the output of the discharge sensor 23 (the signal that is output from the discharge sensor 23) changes. By this change in the output, the control unit 80 detects a position of the trailing edge of the sheet S, and, in a case where the position of the trailing edge of the sheet S is not within a predetermined range, judges that the clogging of the sheet S has occurred.

Behavior of Second Flag when Jam has Occurred

Figure 6:
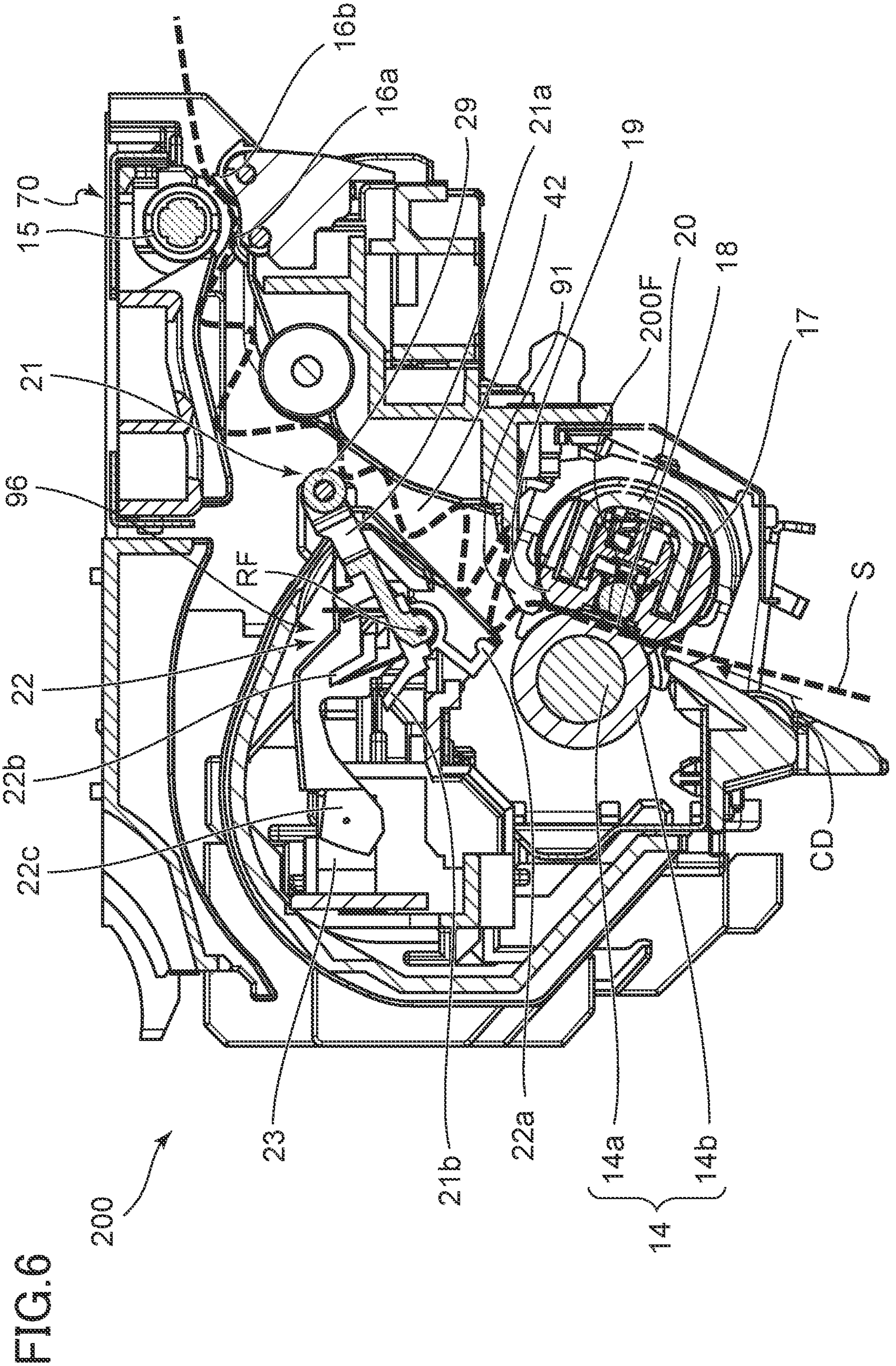
FIG. 6 is a cross-sectional view illustrating the fixing unit in a state in which a sheet jam has occurred.

Next, using FIG. 6, the behavior of the second flag 22 when the jam has occurred after the leading edge of the sheet S passed through the first flag 21 will be described. FIG. 6 is a cross-sectional view of the fixing unit 200 illustrating a state in which the jam of the sheet S has occurred in the conveyance path 42.

Here, a case where it has taken a time to stop the conveyance unit 87 after the jam occurred downstream of the first flag 21 in the conveyance direction CD is considered. In this case, for example, as illustrated in FIG. 6, since the conveyance of the sheet S has been continued after the jam occurred, the sheet S has been folded and become a bellows shape.

In the present embodiment, when the second projecting portion 22*a* comes into contact with the sheet S, the second flag 22 is movable from the second projecting position toward the second retracting position in a state in which the first flag 21 is in the first retracting position. Here, when viewed along the rotational axis RF, a rotation direction of the first flag 21, when moving from the first projecting position to the first retracting position, and a rotation direction of the second flag 22, when moving from the second projecting position to the second retracting position, are opposite to each other.

In the case where the jam has occurred in the conveyance path 42, the sheet S that has been folded in the bellows shape comes into contact with the second projecting portion 22*a* of the second flag 22 that is in the second projecting position, and moves the second flag 22, while resisting against the urging force of the flag urging spring 24. When, in a state in which the first flag 21 is in the first retracting position and the second flag 22 is in the second projecting position, the sheet S comes into contact with the second projecting portion 22*a*, the second flag 22 moves with respect to the first flag 21, and moves from the second projecting position toward the second retracting position. At this time, the second flag 22 pivots conversely to a direction in which the second flag 22 pivots when the sheet S is conveyed normally, and the regulated portion 22*b* is separated from the rotation stop portion 21*b*.

Since the first flag 21 is in contact with the sheet S, the movement of the first flag 21 from the first retracting position to the first projecting position is restricted. However, the second flag 22 is movable from the second projecting position toward the second retracting position with respect to the first flag 21. Therefore, in a state in which the first flag 21 is in the first retracting position, the second flag 22 can move from the second projecting position to the second retracting position.

In particular, in the state in which the first flag 21 is in the first retracting position and the second flag 22 is in the second projecting position, the movement of the second flag 22 in a direction from the second retracting position toward the second projecting position (counter-clockwise direction in FIG. 5) is restricted by the rotation stop portion 21*b* of the first flag 21. On the other hand, in the state in which the first flag 21 is in the first retracting position and the second flag 22 is in the second projecting position, the movement of the second flag 22 in the direction (clockwise direction in FIG. 5) from the second projecting position toward the second retracting position is allowed. Therefore, even in the state in which the first flag 21 is in the first retracting position by being pressed by the sheet S, when the second projecting portion 22*a* is pressed by the sheet S, the second flag 22 can move from the second projecting position toward the second retracting position.

To be noted, the urging force of the flag urging spring 24 is of a magnitude that, when the first flag 21 moves from the first projecting position to the first retracting position, enables the second flag 22 to move integrally with the first flag 21 from the second retracting position to the second projecting position. Further, it is desirable that the urging force of the flag urging spring 24 is set to a magnitude that enables even the sheet S, with the least stiffness among the sheet S usable in the printer 100, to move the second flag 22 with respect to the first flag 21, while resisting against the urging force of the flag urging spring 24.

As described above, when the jam has occurred in the conveyance path 42, in the state in which the first flag 21 is in the first retracting position, the second flag 22 can rotate from the second projection position toward the second retracting position by rotating around the rotational axis RF. Consequently, the detected portion 22*c* blocks the discharge sensor 23, the discharge sensor 23 is switched from the light-transmitting state to the light-shielding state, so that the output of the discharge sensor 23 (the signal that is output from the discharge sensor 23) changes. That is, the discharge sensor 23 is switched from the light-transmitting state to the light-shielding state earlier than the trailing edge of the sheet S passes through the first projecting portion 21*a* in a case where the sheet S is being conveyed normally.

That is, based on the fact that the discharge sensor 23 has reacted at a timing different from a predetermined timing and the output has changed, the control unit 80 can detect that a conveyance defect of the sheet S has occurred.

Figure 7A:
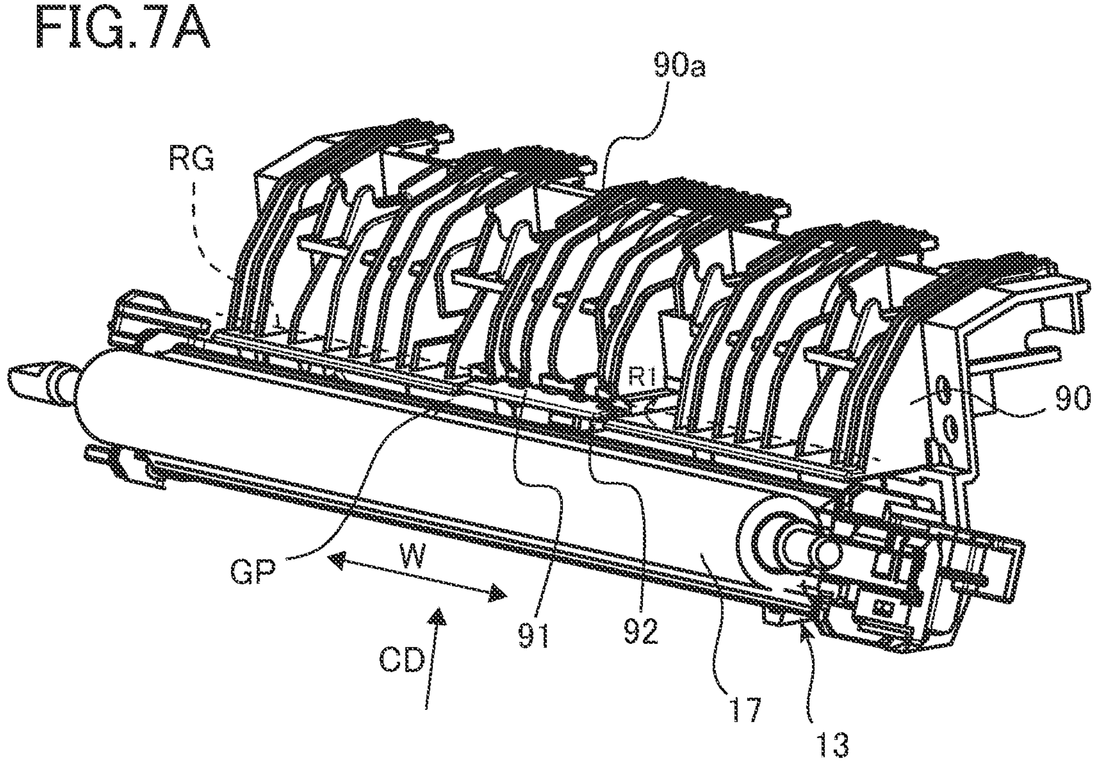
FIG. 7A is a perspective view illustrating a pivot member that is located in a separated position.
Figure 7B:
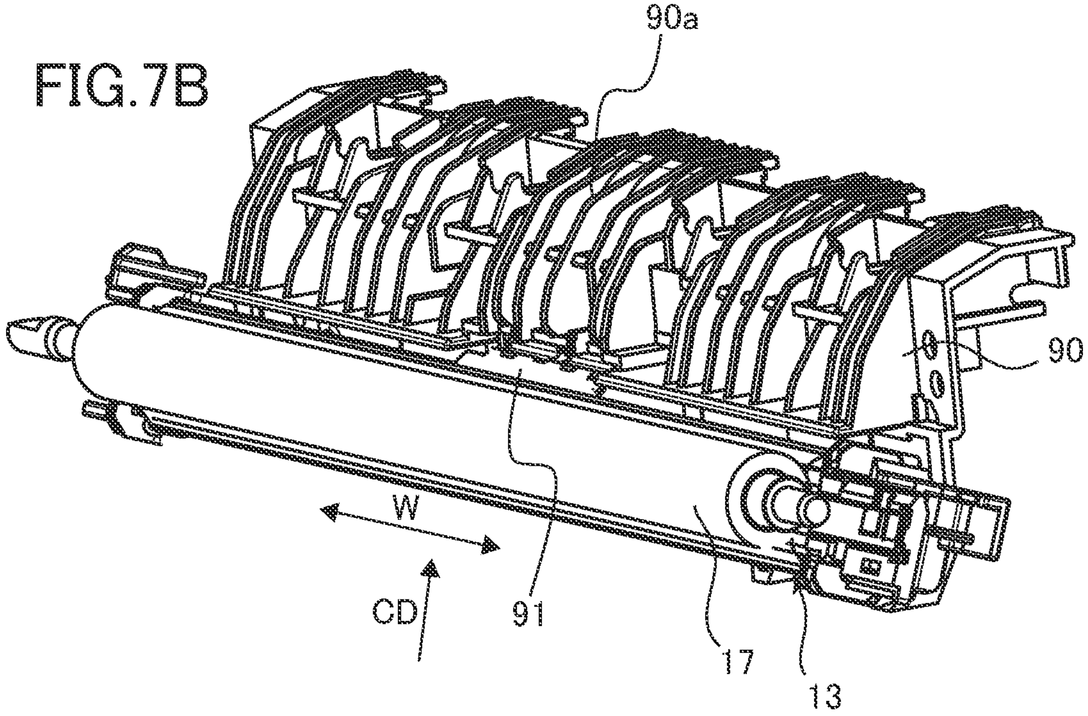
FIG. 7B is a perspective view illustrating the pivot member that is located in a contact position.

Here, using FIGS. 7A and 7B, a configuration to prevent a jammed sheet from entering a gap between a conveyance guide 90 and the fixing film 17 will be described. FIG. 7A is a perspective view illustrating a pivot member 91 that is in a separated position, and FIG. 7B is a perspective view illustrating the pivot member 91 that is in a contact position.

As illustrated in FIG. 7A, the conveyance guide 90 is disposed downstream of the fixing film 17 in the conveyance direction CD. The conveyance guide 90 includes guide surfaces 90*a* guiding the sheet S. A predetermined gap CP is disposed between the guide surfaces 90*a* and the fixing film 17, and the fixing film 17 is rotatable without coming into contact with the conveyance guide 90.

A pivot member 91 is pivotably supported by the conveyance guide 90 around a pivot axis RG as a center. The pivot axis RG extends in a width direction W perpendicular (intersecting) to the conveyance direction CD. Further, the pivot member 91, serving as a pressed member, is disposed in a center portion of the conveyance path 42 (refer to FIG. 6) in the width direction W. Between the conveyance guide 90 and the pivot member 91, a spring 92 is disposed in a contracted state, and the pivot member 91 is urged by the spring 92 in an arrow R1 direction around the pivot axis RG as a center. In a state in which an external force other than the spring 92 is not exerted to the pivot member 91, by abutting against the conveyance guide 90, the pivot member 91 is positioned in the separated position illustrated in FIG. 7A. In the separated position, serving as a first position, the pivot member 91 is separated from the fixing film 17. To be noted, the spring 92 can be anything that urges the pivot member 91 in the arrow R1 direction, and it is possible to apply such as a coil spring, a torsion bar, and a plate spring.

As illustrated in FIG. 6, if, for example, the sheet S is bent in the bellows shape in the conveyance path 42, there is a possibility that the sheet S enters the gap GP between the conveyance guide 90 and the fixing film 17. If the sheet S enters the gap GP, damage may occur to the fixing film 17, and, when the user pulls out the jammed sheet S, a torn sheet S may remain in the gap GP.

Therefore, in the present embodiment, when the pivot member 91 is pressed by the sheet S that has been bent in the bellows shape in the conveyance path 42, as illustrated in FIG. 7B, the pivot member 91 pivots from the separated position to the contact position, while resisting against the urging force of the spring 92. The pivot member 91 comes into contact with the fixing film 17 in the contact position, and, in a position where the pivot member 91 is disposed, can reduce the gap GP as small as possible. Thereby, the sheet S is prevented from entering the gap GP, and it is possible to reduce the occurrence of the damage to the fixing film 17 and a leftover of the torn sheet S, which is generated when the user pulls out the jammed sheet S, in the gap GP. That is, it is possible to reduce the damage to the fixing film 17 and improve jam processing.

To be noted, the pivot member 91 is preferably made from a material with a high degree of a sliding ability with respect to the fixing film 17, and, for example, formed from a resin material that has a low friction coefficient. Further, while, in the present embodiment, in the contact position, serving as a second position, the pivot member 91 comes into contact with the fixing film 17, it is not limited to this. For example, by being pressed by the jammed sheet S and being abutted against a stopper, not shown, the pivot member 91 may pivot to a proximity position that is nearer to the fixing film 17 than the separated position and is separated from the fixing film 17. That is, it is acceptable for the pivot member 91 to pivot such that, when the pivot member 91 is pressed by the sheet S, the gap GP is more narrowed than when the pivot member 91 is located in the separated position. Further, while the pivot member 91 is pivotable around the pivot axis RG as a center, it is not limited to this, and it is acceptable that the pivot member 91 is configured to have the sliding ability.

Detection Timing of Discharge Sensor

Figure 8A:
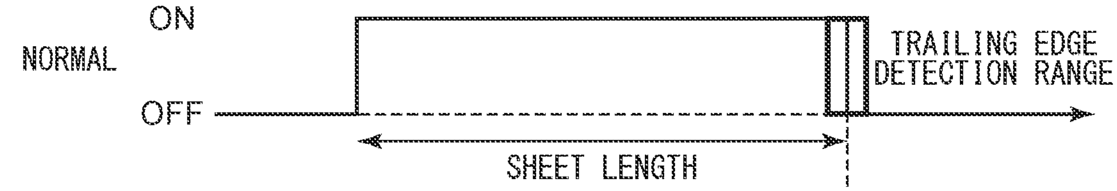
FIG. 8A is a diagram illustrating detection timings of the discharge sensor in a case where the sheet has been normally conveyed.
Figure 8B:
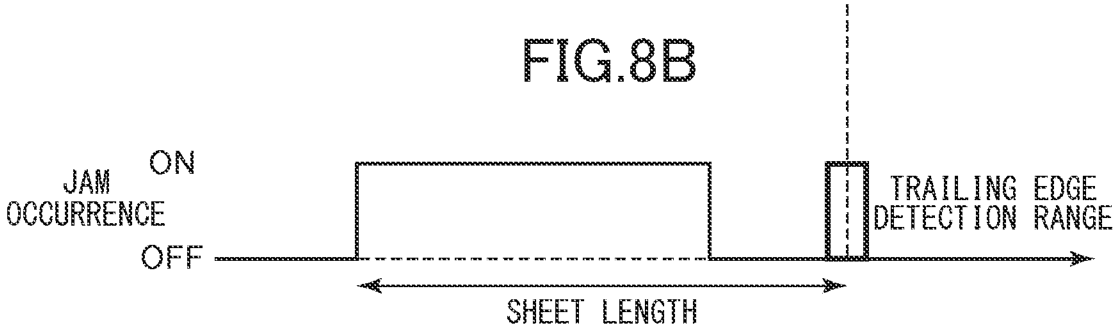
FIG. 8B is a diagram illustrating the detection timings of the discharge sensor in a case where the jam has occurred.

Using FIGS. 8A and 8B, a difference in detection timings of the discharge sensor 23 depending on a conveyance state of the sheet S will be described. FIG. 8A is a diagram illustrating the detection timing of the discharge sensor 23 in a case where the sheet S is conveyed normally, and FIG. 8B is a diagram illustrating the detection timing of the discharge sensor 23 in a case where the jam has occurred. Vertical axes of FIGS. 8A and 8B indicate the output of the discharge sensor 23. The discharge sensor 23 becomes OFF in the light-shielding state, and becomes ON in the light-transmitting state. Horizontal axes of FIGS. 8A and 8B indicate time.

First, in a case where the sheet S is not present in the conveyance path 42, the signal of the discharge sensor 23 becomes OFF. When the sheet normally comes into contact with the first flag 21, the signal of the discharge sensor 23 becomes ON. In the case where the conveyance of the sheet S is normal, during a passage of the sheet S having a predetermined sheet length, a state in which the signal of the discharge sensor 23 is ON continues. Thereafter, when the trailing edge of the sheet S has passed through the first flag 21, the signal of the discharge sensor 23 returns to OFF. The control unit 80 judges whether or not the timing in which the output (signal) of the discharge sensor 23 has been switched from ON to OFF is within a predetermined trailing edge detection range. If the timing in which the output of the discharge sensor 23 has been switched from ON to OFF is within the trailing edge detection range, the control unit 80 judges that the conveyance of the sheet S is normal. Then, the conveyance of the sheet S is continued. On the other hand, in a case where the timing in which the output of the discharge sensor 23 has been switched from ON to OFF is outside of the trailing edge detection range, the control unit 80 judges that the defective conveyance of the sheet S such as the jam has occurred.

The trailing edge detection range is determined based on a timing in which, in the case where the sheet S is conveyed normally, the trailing edge of the sheet S is separated from the first projecting portion 21*a* of the first flag 21, the first flag 21 moves to the first projecting position, and the second flag 22 moves to the second retracting position. The trailing edge detection range is determined by taking into consideration a sheet length of the sheet S and variations in the conveyance of the sheet S. The control unit 80 acquires the sheet length of the sheet S based on information input by the user via the operation unit 86 (refer to FIG. 9) and the output of a sensor detecting the size of the sheet S, and sets the trailing edge detection range based on the sheet length of the sheet S. The control unit 80 can calculate the trailing edge detection range based on the sheet length of the sheet S. Further, the control unit 80 may set the trailing edge detection range by referring to information relating to the trailing edge detection range stored in a memory unit of the printer 100. Also, in a case where the timing in which the signal has been switched from ON to OFF is later than the trailing edge detection range, the control unit 80 judges that the defective conveyance of the sheet S has occurred.

Next, a case where the conveyance of the sheet S is not performed normally will be described. In particular, a case where, after the sheet S has come into contact with the first flag 21 and the signal of the discharge sensor 23 has become ON, the sheet S is jammed on a downstream side of the first flag 21 in the conveyance direction CD will be described.

As described above, when the sheet S has been jammed on the downstream side of the first flag 21 in the conveyance direction CD, the sheet S is bent in the bellows shape. Then, in the state in which the second projecting portion 22*a* of the second flag 22 is pressed by the bent sheet S and the first flag 21 is in the first retracting position, the second flag 22 moves from the second projecting position toward the second retracting position (refer to FIG. 6).

Consequently, the second detected portion 22*c* blocks the discharge sensor 23, and the signal of the discharge sensor 23 changes from ON to OFF. In the case where the second flag 22 is moved to the second retracting position by the sheet S that has caused the jam as described above, the signal of the discharge sensor 23 is switched to OFF in an earlier timing than the trailing edge detection range. In the case where the signal of the discharge sensor 23 has been switched to OFF in the earlier timing than the trailing edge detection range, the control unit 80 judges that the jam of the sheet S has occurred.

Control Block

Figure 9:
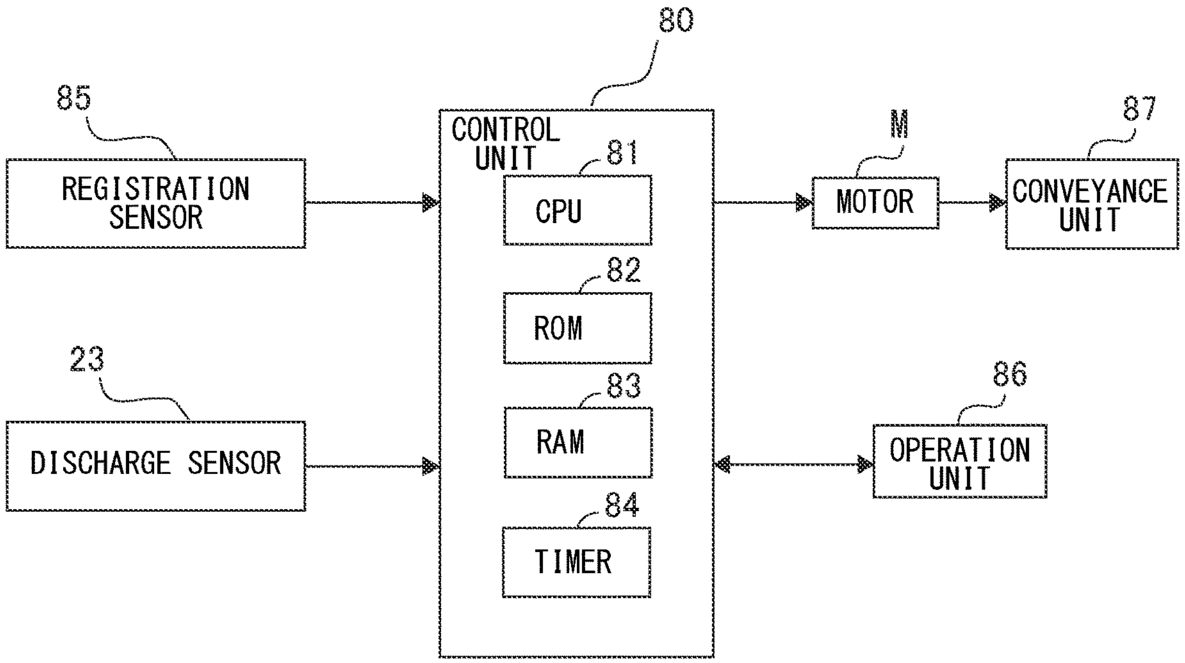
FIG. 9 is a control block diagram of the printer.

FIG. 9 is a control block diagram of the printer 100. As illustrated in FIG. 9, the printer 100 includes the control unit 80, and the control unit 80 includes a central processing unit (CPU) 81, a read only memory (ROM) 82, a random access memory (RAM) 83, and a timer 84. The ROM 82 stores various programs, and the CPU 81 executes the programs stored in the ROM 82. The RAM 83 is used as a working area of the CPU 81. The timer 84 can measure time.

A registration sensor 85 and the discharge sensor 23 are connected to an input side of the control unit 80. As illustrated in FIG. 1, the registration sensor 85 is arranged upstream of the registration roller pair 4 in the conveyance direction CD, and can detect a position of the sheet S that is conveyed. The registration sensor 85, serving as a second detection unit, can also be referred to as being arranged upstream of the transfer nip T1. The registration sensor 85 is configured from, for example, a mechanical sensor including a flag, an optical sensor, and the like. To be noted, it is acceptable to locate the registration sensor 85 downstream of the registration roller pair 4, as long as it is upstream of the transfer nip T1.

The motor M is connected to an output side of the control unit 80. The motor M drives the conveyance unit 87 of the printer 100. The conveyance unit 87 includes the pickup roller 3, the separation roller pair 51, the registration roller pair 4, the photosensitive drum 5, the transfer roller 6, the heating unit 13, the press roller 14, and the sheet discharge roller 15. That is, the conveyance unit 87 has a function to convey the sheet S, and the printer 100 of the present embodiment drives the conveyance unit 87 by the single motor M. Within the conveyance unit 87, the pickup roller 3, the separation roller pair 51, and the registration roller pair 4 form a conveyance unit 99 (refer to FIG. 1). In discharge jam control, described below, the conveyance unit 99 has a function to further convey the sheet S, which has caused a discharge jam, after the detection of the discharge jam. Further, while not included in the conveyance unit 99, in the discharge jam control, described below, also the photosensitive drum 5 has the function to further convey the sheet S, which has caused a discharge jam, after the detection of the discharge jam. To be noted, it is acceptable that, while the conveyance unit 99 includes at least the registration pair 4, the conveyance unit 99 does not include the pickup roller 3 and the separation roller pair 51. The registration roller pair 4 is a roller pair that is located immediately in front of the transfer nip T1 in the conveyance direction CD.

Further, the operation unit 86 through which various settings and inputs are performed by the user is connected to the control unit 80. Based on detection results of the registration sensor 85 and the discharge sensor 23, and by measuring the time using the timer 84 as necessary, the control unit 80 continuously performs a jam assessment for the sheet S.

Discharge Jam Control

Figure 10:
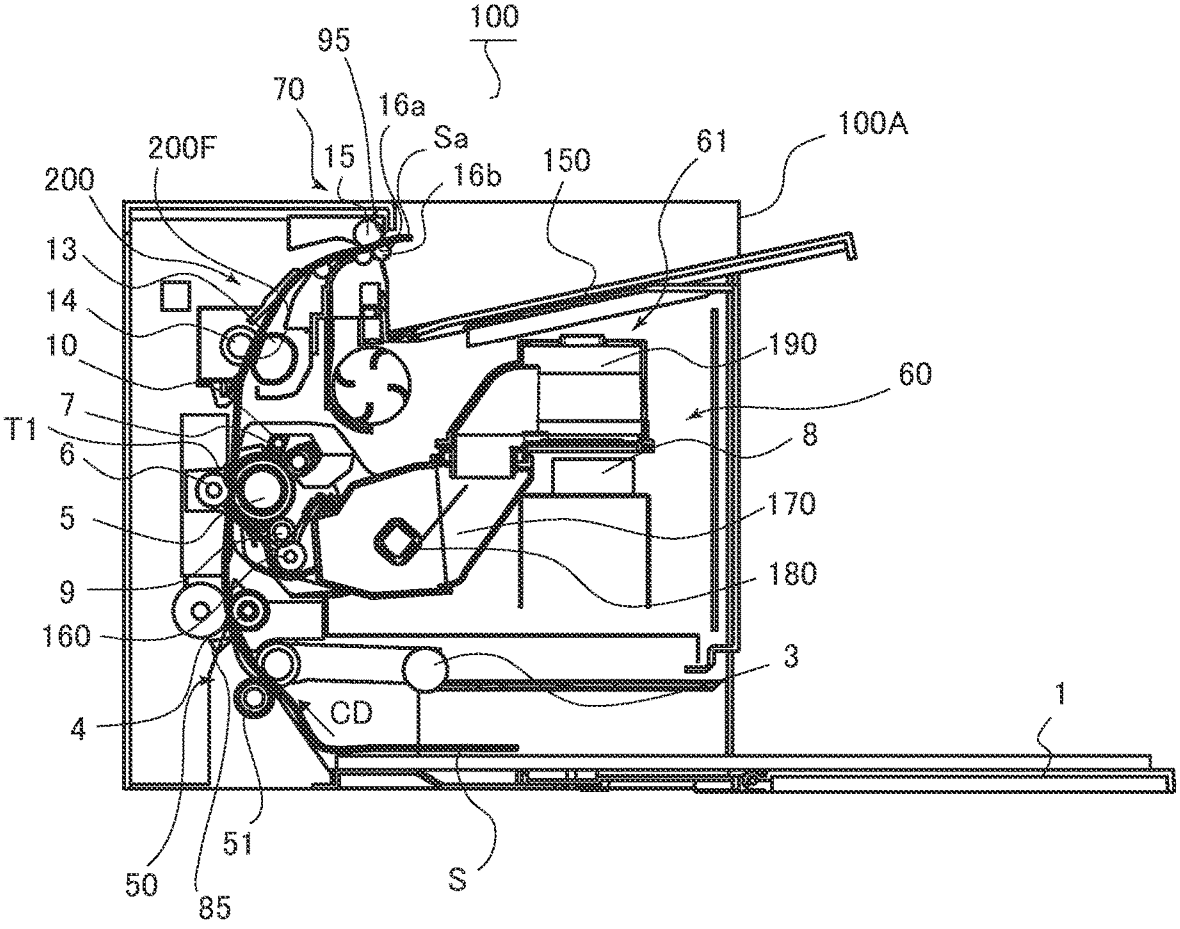
FIG. 10 is a cross-sectional view illustrating a position of a leading edge of the sheet in a case where a discharge jam has occurred.
Figure 11:
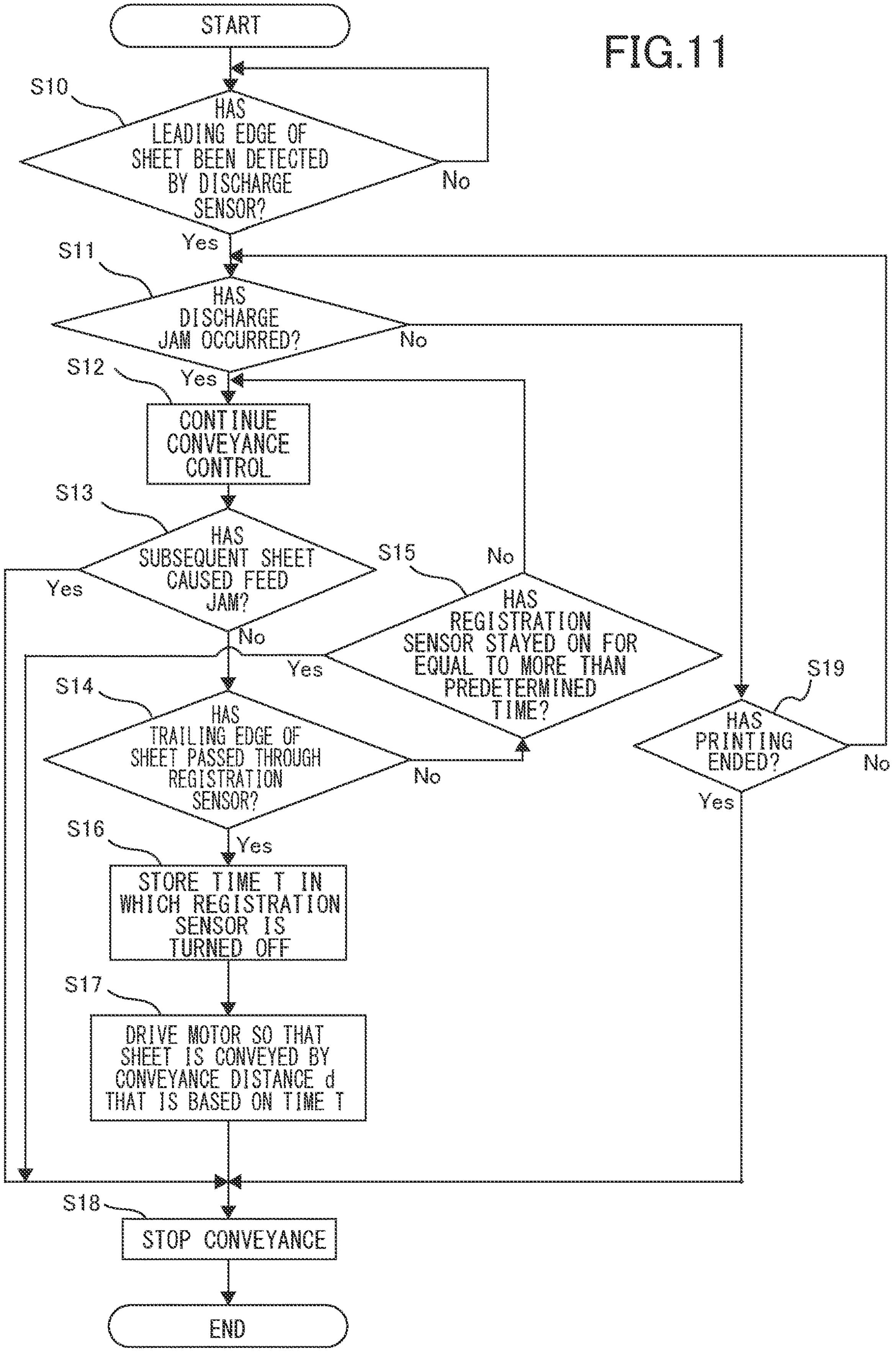
FIG. 11 is a flowchart illustrating discharge jam control.
Figure 12:
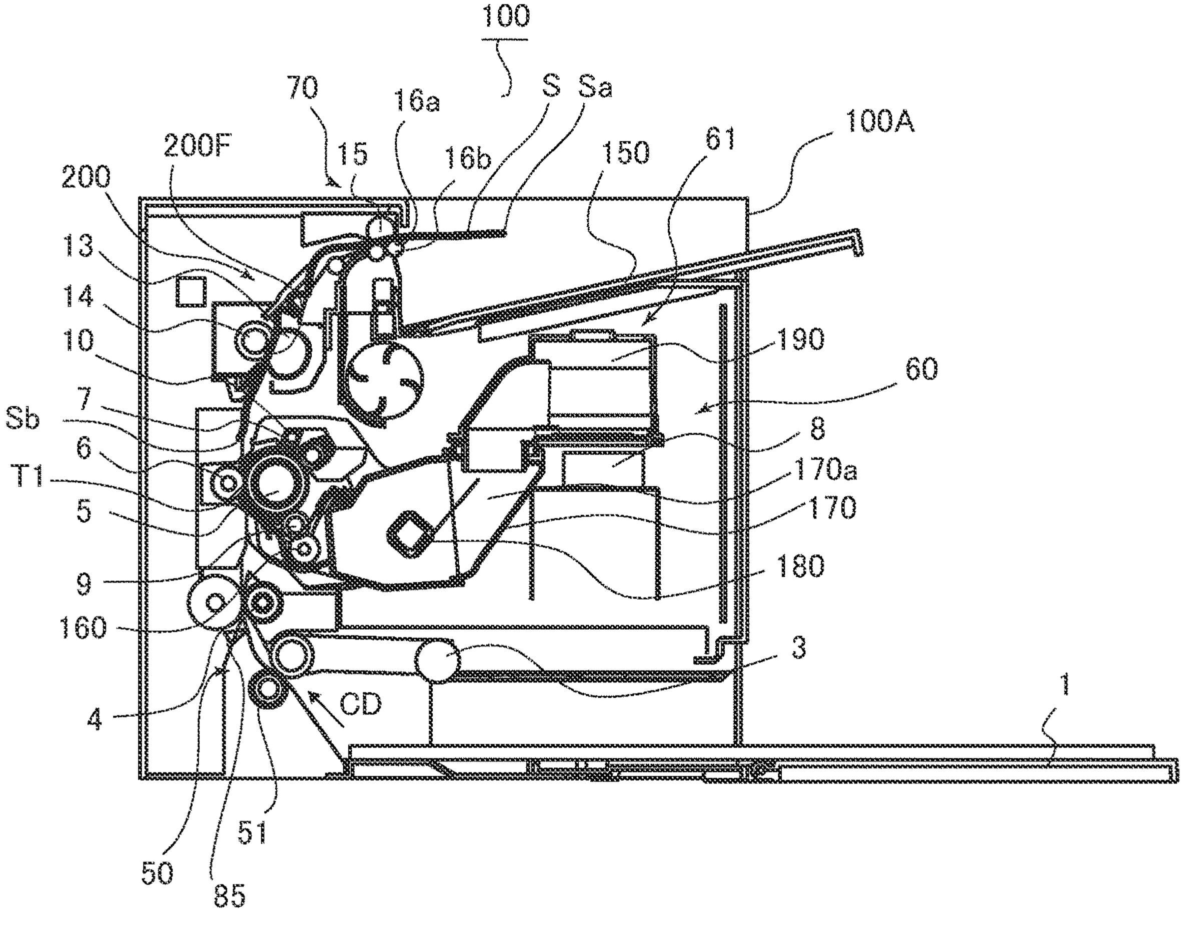
FIG. 12 is a cross-sectional view illustrating a state in which a trailing edge of the sheet has been conveyed to a position downstream of a transfer nip by the discharge jam control.

Next, using FIGS. 10 to 12, the discharge jam control of the present embodiment will be described. FIG. 10 is a cross-sectional view illustrating a position of a leading edge Sa of the sheet S in a case where the discharge jam has occurred. FIG. 11 is a flowchart illustrating the discharge jam control. FIG. 12 is a cross-sectional view illustrating a state in which the trailing edge Sb of the sheet S has been conveyed to reach a downstream side of the transfer nip T1 by the discharge jam control.

The discharge jam control is a control that is performed in a case where, based on the detection result of the discharge sensor 23, it has been judged that the jam occurred. To be noted, there are various types of jams, and, for example, hereinafter, for convenience, it is assumed that there are the discharge jam, a feed jam, and a transfer jam. In the present embodiment, a jam which has occurred downstream of the fixing nip 200F in the conveyance direction CD and is judged based on the detection result of the discharge sensor 23 is referred to as the discharge jam. A jam which is judged based on the fact that the leading edge of the sheet S has not reached the registration sensor 85 within a predetermined timing is referred to as the feed jam. A jam which is judged based on the fact that the registration sensor 85 is turned ON for equal to more than a predetermined time is referred to as the transfer jam.

As illustrated in FIG. 10, in a case where the control unit 80 has judged that the discharge jam occurred, there is a possibility that the leading edge Sa of the sheet S protrudes outside from a sheet discharge port 95 of the printer 100. The sheet discharge port 95 is a space through which an interior and an exterior of the printer 100 communicate. In a case where the leading edge Sa of the sheet S is located outside of the sheet discharge port 95, the user can perform the jam processing by pulling out the jammed sheet S from the sheet discharge port 95.

In FIG. 10, the jammed sheet S is nipped by the separation roller pair 51, the registration roller pair 4, and the transfer nip T1. If the user tries to pull out the sheet S from the sheet discharge port 95 in this state, by friction forces in the separation roller pair 51, the registration roller pair 4, and the transfer nip T1, resistance at the time of pulling out the sheet S is large.

Therefore, in the present embodiment, the discharge jam control illustrated in the flowchart of FIG. 11 is performed. As illustrated in FIG. 11, at first, the control unit 80 judges whether or not the leading edge Sa of the sheet S has been detected by the discharge sensor 23 (STEP S10). In a case where it is judged that the leading edge Sa of the sheet S has been detected by the discharge sensor 23 (STEP S10: Yes), the control unit 80 judges whether or not the discharge jam has occurred (STEP S11). As described above, in the case where the signal of the discharge sensor 23 has been switched from ON to OFF in the earlier timing or the later timing than the tailing edge detection range, the control unit 80 judges that the discharge jam has occurred.

In a case where the control unit 80 has judged that the discharge jam occurred (STEP S11: Yes), the control unit 80 controls the motor M to continue the conveyance by the conveyance unit 87. That is, the control unit 80 continues conveyance control (STEP S12). Next, the control unit 80 judges whether or not a subsequent sheet succeeding the sheet S which caused the discharge jam has caused the feed jam (STEP S13). In a case where the subsequent sheet has caused the feed jam (STEP S13: Yes), the control unit 80 stops the drive of the motor M to halt the conveyance by the conveyance unit 87 (STEP S18).

On the other hand, in a case where it has been judged that the subsequent sheet has not caused the feed jam (STEP S13: No), the control unit 80 judges whether or not the trailing edge of the sheet S, which caused the discharge jam, has passed through the registration sensor 85 (STEP S14). In a case where it has been judged that the trailing edge of the sheet S has not passed through the registration sensor 85 (STEP S14: No), the control unit 80 judges whether or not the registration sensor 85 has been turned ON for equal to more than the predetermined time (STEP S15). That is, in STEP S15, it is checked whether or not the sheet S is retained in a way that makes the registration sensor 85 stay ON and, thereby, causes the transfer jam. To be noted, the judgement of the transfer jam and the jam of the subsequent sheet may be performed before the judgement of the discharge jam.

In a case where it has been judged that the registration sensor 85 was ON for equal to or more than the predetermined time (STEP S15: Yes), the control unit 80 stops the drive of the motor M to halt the conveyance by the conveyance unit 87 (STEP S18). Further, in a case where it has been judged that the registration sensor 85 was not turned ON for equal to or more than the predetermined time (STEP S15: No), the control unit 80 returns to STEP S12, and continues the conveyance control.

In a case where, in STEP S14, it has been judged that the trailing edge of the sheet S passed through the registration sensor 85 (STEP S14: Yes), in the RAM 83, the control unit 80 stores time T in which the registration sensor 85 was turned OFF (STEP S16). Next, based on the time T, the control unit 80 drives the motor M such that the sheet S is conveyed by a conveyance distance d which is a predetermined distance from a position of the registration sensor 85 (STEP S17). The conveyance distance d is a distance from the position of the registration sensor 85 to a predetermined position on a downstream side of the transfer nip T1. Thereby, as illustrated in FIG. 12, the sheet S that is the jammed sheet having caused the discharge jam is conveyed until the trailing edge Sb of the sheet S reaches downstream of the transfer nip T1 in the conveyance direction CD. At this time, the leading edge Sa of the sheet S is being exposed from the sheet discharge port 95. Then, the control unit 80 halts the drive of conveyance unit 87 by stopping the motor M (STEP S18), and ends the processing.

To be noted, in the flowchart in FIG. 11, a case where, subsequent to the occurrence of the discharge jam in STEP S11, in STEP S14, the trailing edge Sb of the sheet S passes through the registration sensor 85 is described. In the present embodiment, it is not limited to this. For example, in a case of a small size sheet, sometimes, at a time when it has been judged that the discharge jam occurred, the trailing edge Sb of the sheet S is located downstream of the registration sensor 85 in the conveyance direction CD. In such a case, based on a difference between the time, when the trailing edge Sb passed through registration sensor 85, and the time, when the jam has occurred, the control unit 80 judges a position of the trailing edge Sb of the sheet at the time of the occurrence of the discharge jam. In a case where it has been judged that the trailing edge Sb of the sheet S is positioned further upstream than the transfer nip T1, the control unit 80 conveys the sheet S from that position to the predetermined position on the downstream side of the transfer nip T1. That is, based on the detection result of the registration sensor 85, the control unit 80 obtains the necessary conveyance distance of the sheet S until the trailing edge Sb moves downstream of the transfer nip T1 in the conveyance direction CD.

In the discharge jam control described above, STEPS S12, S17, and S18 form a conveyance processing in which the sheet S that has been jammed is conveyed by the conveyance unit 99 and the photosensitive drum 5. Then, in the middle of that conveyance processing, in a case where the sheet S has caused the transfer jam, and in a case where the subsequent sheet succeeding the sheet S has caused the feed jam, the conveyance of the sheet S is halted.

Further, in a case where, in STEP S11, it has been judged that the discharge jam has not occurred (STEP S11: No), the control unit 80 judges whether or not printing has ended (STEP S19). In a case where it has been judged that the printing ended (STEP S19: Yes), the control unit 80 stops the motor M to halt the conveyance by the conveyance unit 87 (STEP S18). Further, in a case where it has not been judged that the printing ended (STEP S19: No), the control unit 80 returns to STEP S11.

As described above, in the present embodiment, even if the discharge jam has occurred, the motor M is not stopped immediately, and the jammed sheet S is conveyed until the trailing edge Sb of the jammed sheet S is located downstream of the transfer nip T1 in the conveyance direction CD. Thereby, the sheet S ceases to be nipped by the separation roller pair 51, the registration roller pair 4, and the transfer nip T1, and it is possible to reduce the resistance when the user pulls out the sheet S from the sheet discharge port 95. Therefore, the user can pull out the sheet S with less force, and it is possible to reduce the breakage of the sheet S at the time of pulling out the sheet S. Therefore, it is possible to improve the jam processing.

Further, by continuing the conveyance of the sheet S even if the discharge jam has occurred, sometimes the sheet S is bent in the bellows shape. However, as illustrated in FIGS. 7A and 7B, in the present embodiment, the pivot member 91 that, when pressed by the jammed sheet S, pivots from the separated position to the contact position is disposed. By moving the pivot member 91 to the contact position, even if the sheet S has been bent in the bellows shape in the conveyance path 42 (refer to FIG. 6), it is possible to prevent the sheet S from entering the gap GP between the conveyance guide 90 and the fixing film 17.

Further, in a case where, during when continuing the conveyance of the sheet S after the discharge jam occurred (STEPS S12 to S17), the sheet S has caused the transfer jam or the subsequent sheet has caused the feed jam, the control unit 80 immediately stops the motor M. Therefore, it is possible to prevent a worsening of other jams by the continuation of the conveyance of the sheet S (STEP S12), and possible to improve the jam processing.

Other Embodiments

To be noted, while, in the present embodiment, the fixing film 17 is heated by bringing the heater 18 of the heating unit 13 into direct contact with the fixing film 17, it is not limited to this. For example, the heater 18 may come into contact with the fixing film 17 via a sheet material such as iron alloy or aluminum that has high thermal conductivity.

Further, while, in the present embodiment, the sheet conveyance control in the discharge jam control is performed based on the time T in which the registration sensor 85 has detected the trailing edge Sb of the sheet S, it is not limited to this. For example, in a case where the sheet length (sheet size) has been known beforehand by an instruction from the user, it is acceptable to control the sheet S based on time T12 in which the registration sensor 85 has detected the leading edge Sa of the sheet S. In particular, the control unit 80 estimates the position of the tailing edge Sb of the sheet S at the time of the occurrence of the discharge jam from time in which it has been judged that the discharge jam occurred, the time T12, and the sheet length that has been acquired. Then, the control unit 80 may convey the sheet S from that position so that the trailing edge Sb of the sheet S is moved to the position on the downstream side of the transfer nip T1.

Further, while, in the present embodiment, the printer 100 is the monochrome laser beam printer, it is not limited to this. For example, it is acceptable that the printer 100 is a full color laser beam printer. In this case, an intermediate transfer belt has a function of an image bearing member that bears the toner image.

Further, while, in the present embodiment, the pivot member 91 comes into contact with the fixing film 17 in the contact position, it is not limited to this. For example, it is acceptable that the pivot member 91 is configured to come into contact not with the fixing film 17, but with the press roller 14 instead. Thereby, it is possible to reduce the intrusion of the sheet S into a gap between a guide member facing the conveyance guide 90 and the press roller 14. That is, the pivot member 91 may come into contact with either the fixing film 17, serving as a first rotary member and a film, or the press roller 14, serving as a second rotary member.

While, in the present embodiment, the position of the sheet is detected by the discharge sensor 23 via the first and second flags 21 and 22, it is not limited to this. For, example, in place of the discharge sensor 23, it is acceptable to apply an optical sensor that detects the position of the sheet by detecting reflected light reflected from the conveyed sheet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-192260, filed Nov. 30, 2022, which is hereby incorporated by reference herein in its entirety.

What is claimed is:

1. An image forming apparatus comprising:

a conveyance unit configured to convey a sheet in a conveyance direction;

an image bearing member configured to bear a toner image;

a transfer unit configured to form a transfer nip together with the image bearing member, the transfer unit being configured to transfer, in the transfer nip, the toner image borne on the image bearing member to the sheet conveyed by the conveyance unit;

a fixing unit configured to fix the toner image, transferred onto the sheet in the transfer nip, on the sheet in a fixing nip;

a sheet discharge unit configured to discharge the sheet on which the toner image has been fixed by the fixing unit;

a detection unit arranged between the fixing nip and the sheet discharge unit in the conveyance direction and configured to detect the sheet; and a control unit configured to control conveyance of the sheet by controlling the conveyance unit and the image bearing member, wherein in a case where the control unit has judged that a jam occurred by a jammed sheet based on a detection result of the detection unit, the control unit is configured to perform a conveyance processing of conveying the jammed sheet such that a trailing edge of the jammed sheet reaches a downstream side of the transfer nip in the conveyance direction.

2. The image forming apparatus according to claim 1, wherein, in the conveyance processing, the control unit is configured to stop the conveyance of the jammed sheet in a state in which the trailing edge of the jammed sheet is located between the transfer nip and the fixing nip in the conveyance direction.

3. The image forming apparatus according to claim 1, wherein the detection unit is a first detection unit, and wherein the image forming apparatus further comprises a second detection unit arranged upstream of the transfer nip in the conveyance direction, the second detection unit being configured to detect the sheet.

4. The image forming apparatus according to claim 3, wherein, in the conveyance processing, the control unit is configured to convey the jammed sheet by a predetermined conveyance distance after the second detection unit has detected the trailing edge in a case where the trailing edge of the jammed sheet is located upstream of the second detection unit in the conveyance direction when the jam occurred.

5. The image forming apparatus according to claim 3, wherein, in the conveyance processing, the control unit obtains a conveyance distance of the jammed sheet based on a detection result of the second detection unit in a case where the trailing edge of the jammed sheet is located downstream of the second detection unit and located upstream of the transfer nip in the conveyance direction when the jam occurred, and wherein the conveyance distance of the jammed sheet is a distance where the trailing edge reaches the downstream side of the transfer nip in the conveyance direction.

6. The image forming apparatus according to claim 3, wherein the control unit stops the conveyance of the jammed sheet in a case where the second detection unit has detected the jammed sheet for equal to or more than a predetermined time in a middle of the conveyance processing.

7. The image forming apparatus according to claim 1, wherein the control unit stops the conveyance of the jammed sheet in a case where the control unit has judged that a jam of a subsequent sheet succeeding the jammed sheet occurred in a middle of the conveyance processing.

8. The image forming apparatus according to claim 1, wherein a leading edge of the jammed sheet, on which the conveyance processing has been performed, is exposed from a sheet discharge port that is disposed downstream of the sheet discharge unit in the conveyance direction.

9. The image forming apparatus according to claim 1, wherein the fixing unit includes a first rotary member and a second rotary member each configured to rotate, wherein the first rotary member and the second rotary member are configured to form the fixing nip by coming into contact with each other, and wherein the image forming apparatus further comprises:

a conveyance guide including a guide surface configured to guide the sheet on a downstream side of the fixing nip in the conveyance direction; and a pressed member movably supported by the conveyance guide, the pressed member being configured to move from a first position to a second position by being pressed by the jammed sheet, the first position being a position where the pressed member is separated with respect to the first rotary member, the second position being nearer to the first rotary member than the first position.

10. The image forming apparatus according to claim 9, wherein the pressed member is configured to come into contact with the first rotary member in the second position.

11. The image forming apparatus according to claim 9, wherein the fixing unit includes a heater, and wherein the first rotary member includes a film that is configured to be heated by the heater.

12. The image forming apparatus according to claim 1, further comprising a conveyance path, through which the sheet passes, disposed downstream of the fixing nip in the conveyance direction, wherein the detection unit includes:

a first moving member including a first projecting portion, the first moving member being movable between a first projecting position in which the first projecting portion projects toward the conveyance path, and a first retracting position in which the first projecting portion retracts from the first projecting position, the first moving member moving from the first projecting position toward the first retracting position when the first projecting portion comes into contact with the sheet;

a second moving member including a second projecting portion, the second moving member being movable with respect to the first moving member between a second projecting position in which the second projecting portion projects toward the conveyance path, and a second retracting position in which the second projecting portion retracts from the second projecting position the second moving member moving from the second retracting position to the second projecting position when the first moving member moves from the first projecting position to the first retracting position; and a sensor configured to detect a movement of the second moving member, and wherein the second moving member is movable from the second projecting position toward the second retracting position in a state in which the first moving member is in the first retracting position in a case where the second projection portion is pressed by the jammed sheet.

13. The image forming apparatus according to claim 12, wherein the first moving member is rotatable around a rotational axis, wherein the second moving member is rotatable around the rotational axis, and wherein, when viewed along the rotational axis, a rotation direction, in which the first moving member moves from the first projecting position to the first retracting position, and a rotation direction, in which the second moving member moves from the second projecting position to the second retracting position, are opposite to each other.

14. The image forming apparatus according to claim 12, wherein the second projecting portion is arranged upstream of the first projecting portion in the conveyance direction.

15. The image forming apparatus according to claim 12, further comprising an urging member configured to urge the first moving member and the second moving member, wherein the first moving member includes a supporting portion, wherein the second moving member includes a supported portion, and wherein the urging member is configured to urge the first moving member and the second moving member such that the supported portion is pressed onto the supporting portion.

16. The image forming apparatus according to claim 1, further comprising a developing unit including:

a storage portion configured to store toner;

a developing member configured to develop the toner image using the toner stored in the storage portion; and a replenishment port to which a toner container is configured to be mounted, and through which the toner container is replenished with the toner from the storage portion, and wherein at least a part of the toner container mounted to the replenishment port is exposed outside of the image forming apparatus.

* * * * *